United States Patent
Seol et al.

(10) Patent No.: US 10,924,944 B2
(45) Date of Patent: Feb. 16, 2021

(54) APPARATUS AND METHOD FOR MONITORING PERFORMANCE OF NETWORK DEVICE IN WIRELESS COMMUNICATION SYSTEM

(71) Applicant: Samsung Electronics Co., Ltd., Suwon-si (KR)

(72) Inventors: Jaeyoung Seol, Suwon-si (KR); Sungbum Park, Suwon-si (KR); Mikyung Kang, Suwon-si (KR); Harim Kang, Suwon-si (KR); Minsung Kim, Suwon-si (KR); Hwanhee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/727,617

(22) Filed: Dec. 26, 2019

(65) Prior Publication Data

US 2020/0213875 A1 Jul. 2, 2020

(30) Foreign Application Priority Data

Dec. 26, 2018 (KR) .................. 10-2018-0169283

(51) Int. Cl.
| | | |
|---|---|---|
| *H04W 24/02* | (2009.01) | |
| *H04W 88/08* | (2009.01) | |
| *H04W 24/04* | (2009.01) | |
| *H04W 88/10* | (2009.01) | |

(52) U.S. Cl.
CPC ........... *H04W 24/02* (2013.01); *H04W 24/04* (2013.01); *H04W 88/08* (2013.01); *H04W 88/10* (2013.01)

(58) Field of Classification Search
None
See application file for complete search history.

(56) References Cited

U.S. PATENT DOCUMENTS

| | | |
|---|---|---|
| 7,519,860 B2 | 4/2009 | Hatonen et al. |
| 8,375,255 B2 | 2/2013 | Wang et al. |
| 8,433,260 B2 | 4/2013 | Kennington et al. |
| 8,611,228 B2 | 12/2013 | Matsunaga et al. |

(Continued)

FOREIGN PATENT DOCUMENTS

| | | | |
|---|---|---|---|
| EP | 2897404 B1 | 11/2017 | |
| WO | WO-2017028933 A1 * | 2/2017 | ........ H04W 28/0231 |

OTHER PUBLICATIONS

International Search Report dated Apr. 17, 2020, issued in International Application No. PCT/KR2019/018521.

(Continued)

*Primary Examiner* — San Htun
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus that monitors a base station in a wireless communication system and a method therefor are provided. The method of operating the apparatus includes detecting an anomaly occurring in the base station, determining at least one measure, based on the detected result, and performing or outputting the determined at least one measure.

12 Claims, 11 Drawing Sheets

(56) References Cited

U.S. PATENT DOCUMENTS

| | | | |
|---|---|---|---|
| 9,681,317 B2 | 6/2017 | Carlin et al. | |
| 2009/0052330 A1* | 2/2009 | Matsunaga | H04L 1/0019 370/242 |
| 2012/0058796 A1* | 3/2012 | Miyabayashi | H04W 24/04 455/522 |
| 2016/0309332 A1* | 10/2016 | Norrman | H04W 24/08 |

OTHER PUBLICATIONS

Written Opinion dated Apr. 17, 2020, issued in International Application No. PCT/KR2019/018521.

* cited by examiner

APPARATUS AND METHOD FOR MONITORING PERFORMANCE OF NETWORK DEVICE IN WIRELESS COMMUNICATION SYSTEM

CROSS-REFERENCE TO RELATED APPLICATION(S)

This application is based on and claims priority under 35 U.S.C. § 119 of a Korean patent application number 10-2018-0169283, filed on Dec. 26, 2018, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for monitoring the performance of a network device in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A technology that proposes a method of operating a communication network to reduce inconvenience that users may feel while using services in such a wireless communication system has been proposed. In particular, methods that can efficiently handle faults that are generated in network devices such as a base station while a communication network is operated have been studied. In particular, there is a need for a plan that handles a fault generated in a base station while minimizing cell outage to reduce the time for which a user cannot use a wireless communication service when an operational failure is generated in a cell that is provided by the base station.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively monitoring the performance of a network device in a wireless communication system.

Another aspect of the disclosure is to provide an apparatus and method for determining whether there is a hardware fault in a network device in a wireless communication system.

Another aspect of the disclosure is to provide an apparatus and method for determining measures according to the types of the factors that cause an anomaly in a network device in a wireless communication system.

Another aspect of the disclosure is to provide an apparatus and method for determining whether there is a need for urgent replacement of hardware in a network device in a wireless communication system.

Additional aspects will be set forth in part in the description which follows and, in part, will be apparent from the description, or may be learned by practice of the presented embodiments.

In accordance with an aspect of the disclosure, a method of operating an apparatus that monitors a base station in a wireless communication system is provided. The method includes detecting an anomaly occurring in the base station, determining at least one measure, based on the detected result, and performing or outputting the determined at least one measure.

In accordance with another aspect of the disclosure, an apparatus that monitors a base station in a wireless communication system includes a storage and at least one processor is provided. The at least one processor may detect an anomaly occurring in the base station, determine at least one measure, based on the detected result, and perform or output the determined at least one measure.

The apparatus and method according to various embodiments of the disclosure make it possible to reduce unnecessary cell outage that is generated due to hardware replacement by improving accuracy in detection of a hardware fault of a base station.

Further, the apparatus and method according to various embodiments of the disclosure make it possible to efficiently hand an anomaly of a base station device by performing a predetermined measure in accordance with a data analysis result for an anomaly generated in the base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
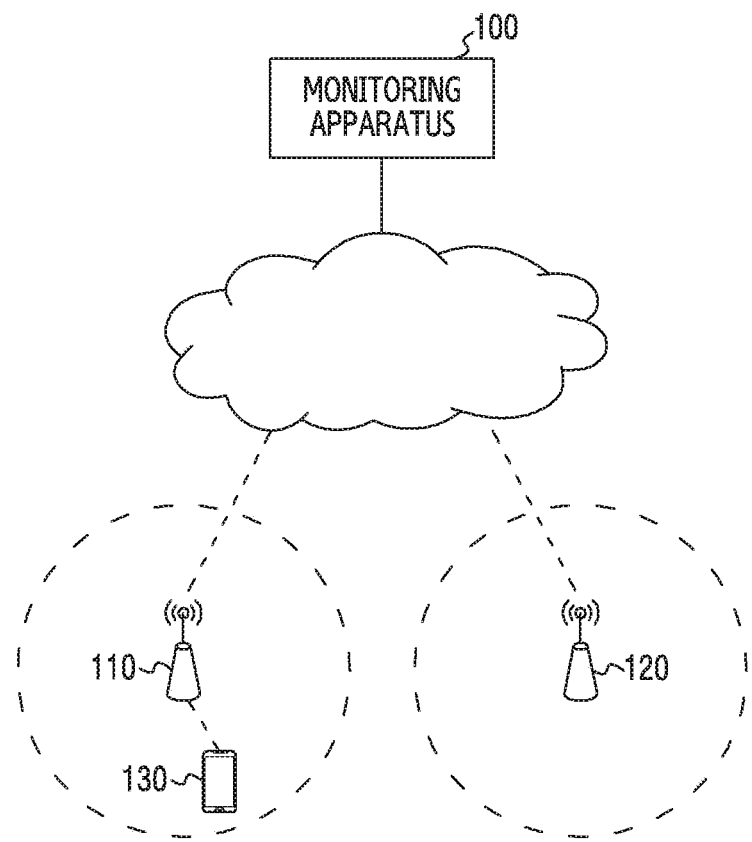
FIG. 1 shows a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to an apparatus and method for handling a performance anomaly of a network device in a wireless communication system. In detail, the disclosure describes a technology for determining a measure based on whether there is a fault in a base station and based on a hardware fault type in a wireless communication system.

The terms indicating network entities, the terms (e.g., hardware log information) indicating data stored in network entities, the terms indicating measures based on detection results, the terms indicating components of an apparatus, etc. which are described hereafter are examples for the convenience of description. Accordingly, the disclosure is not limited to the terms to be described hereafter and other terms having equivalent meanings may be used.

In particular, the term 'fault' may be used to mean a breakdown that causes a state in which a base station cannot provide services to terminals in the coverage of cells. The term 'anomaly' and 'abnormality' may be used throughout the disclosure to mean all situations occurring out of a normal range in a base station including when performance such as transmission power of a base station, the intensity of a clock signal, and data processing capacity shows measured values lower than set values, when performance such as a power consumption amount of a base station and a call drop ratio shows measured values higher than set values, or when temperature changes over a predetermined range.

Various embodiments are described herein using the terms, which are used in some communication standards (e.g., $3^{rd}$ generation partnership project (3GPP)), but they are only examples for description. Various embodiments of the disclosure may be easily modified to be applied to other communication systems.

An alarm system is used to handle faults that are generated in a network device such as a base station while a communication network is operated in a wireless communication system. When an anomaly occurs in a base station, the alarm system generates an alarm saying what performance parameter the anomaly is related to. When an alarm is generated, trouble shooting for finding out the reason of the anomaly such as replacing peripheral equipment such as a cable and resetting software is attempted, and if the performance of situation of the a base station does not return to the normal range even by these attempts, a method of solving this anomaly by finally replacing hardware is performed. According to the method described above, it is limited to checking which components of the base station a fault has occurred in and generating an alarm, so users suffer inconvenience in using communication services due to cell outage that may be generated in trouble shooting. Accordingly, there is a need for an alternative measure that can reduce unnecessary cell outage by accurate determining and efficiently handling a fault reason in a base station.

FIG. 1 shows a wireless communication system according to an embodiment of the disclosure. The wireless communication system shown in FIG. 1 includes a monitoring apparatus 100, a first base station 110, a second base station 120, and a terminal 130.

Referring to FIG. 1, the monitoring apparatus 100 is an apparatus for managing operation of the first base station 110 and the second base station 120. The monitoring apparatus 100 performs a function that handles a failure that is generated while cells, which are serviced by the first base station 110 and the second base station 120, are operated, by monitoring the performance of the first base station 110 and the second base station 120. For example, the monitoring apparatus 100 can monitor performance measurement values such as transmission power and operation voltage of the first base station 110 and the second base station 120 and determine whether there is a fault in hardware. In order to perform the function, the monitoring apparatus 100 may include several entities that have different network functions (NF) and are functionally separated. Hereafter, the monitoring apparatus 100 is described as an apparatus separated from a base station for the convenience of description, but the disclosure is not limited thereto. That is, the monitoring apparatus 100 may be positioned in a base station or may perform the functions described above as an apparatus separated from a base station.

The first base station 110 and the second base station 120 are network infrastructures that provide wireless connection to the terminal 130. The first base station 110 and the second base station 120 have a coverage that is defined as a predetermined geometric area, based on a distance up to which they can transmit signals. The first base station 110 and the second base station 120 each may be referred to, other than the term 'base station', as an access point (AP), an eNodeB (eNB), a 5G node ($5^{th}$ generation node), gNodeB (next generation NodeB, gNB), a wireless point, a transmission/reception point (TRP), or other terms having equivalent technical meanings as these terms.

The terminal 130, which is a device that is used by a user, performs communication through a wireless channel with the first base station 110. Depending on cases, the terminal 130 may be operated without participation of a user. That is, the terminal 130 may not be carried by a user, as a device that performs machine type communication (MTC). The terminal 130 may be referred to, other than the term 'terminal', as user equipment (UE), a mobile station, a subscriber station, a remote terminal, a wireless terminal, or a user device, or other terms having equivalent technical meanings as these terms.

Figure 2:
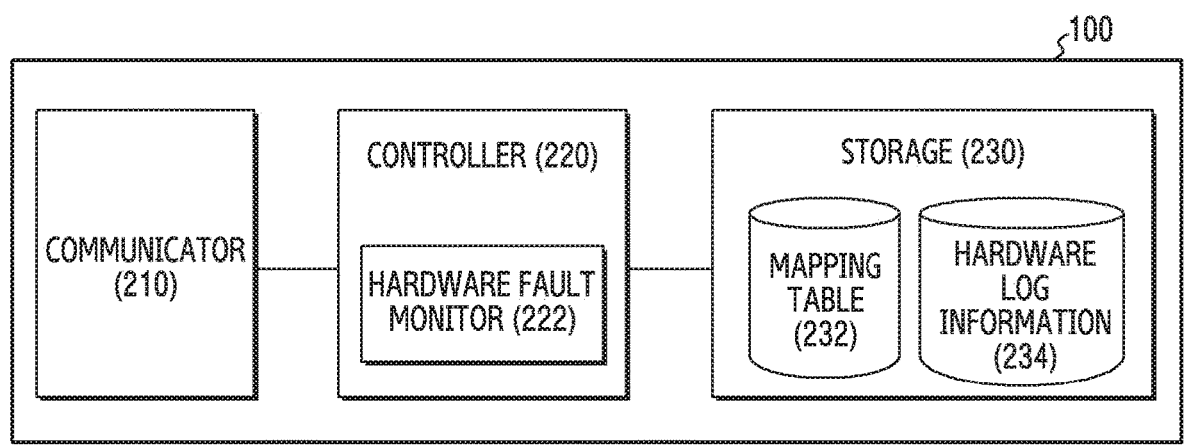
FIG. 2 shows the configuration of a monitoring apparatus in a wireless communication system according to an embodiment of the disclosure.

FIG. 2 shows the configuration of a monitoring apparatus in a wireless communication system according to an embodiment of the disclosure. The configuration exemplified in FIG. 2 may be understood as the configuration of the monitoring apparatus 100. Terms ' . . . unit', ' . . . er' used hereafter mean the unit for processing at least one function or operation and may be implemented by hardware, software, or a combination of hardware and software.

Referring to FIG. 2, the monitoring apparatus includes a communicator 210 (e.g., a transceiver), a controller 220 (e.g., at least one processor), and a storage 230 (e.g., a memory).

The communicator 210 can perform functions for transmitting/receiving information. In detail, communicator 210 provides an interface for communication with other nodes in the network. That is, the communicator 210 physically converts bit strings transmitted from a management device to other nodes, for example, base stations (e.g., the first base station 110 and the second base station 120) and converts physical signals received from base stations into physical signals. The communicator 210 can also perform functions for transmitting/receiving signals in a wireless communication environment. For example, the communicator 210 can perform a conversion function among base band signals and bit strings in accordance with the physical layer specification of the system. The communicator 210 may include a plurality of transmission/reception paths.

The communicator 210 transmits and receives signals, as described above. Accordingly, the communicator 210 may be referred to as a 'transmitter', a 'receiver', or a 'transceiver'. Transmission and reception are used as meanings that include the above-mentioned processing performed by the communicator 210.

According to various embodiments of the disclosure, the communicator 210 can receive hardware log information from base stations. The hardware log information may include measurement information that is considered to determine whether the base stations are normally operated. According to various embodiments of the disclosure, the communicator 210 can transmit a signal for giving an instruction to perform a cell optimization measure to other devices (e.g., an optimization server).

The controller 220 controls the general operation of the monitoring apparatus. For example, the controller 220 transmits and receives signals through the communicator 210. The controller 220 records and reads data on and from the storage 230. The controller 230 may include at least one processor.

According to various embodiments of the disclosure, the controller 220 may include a hardware fault monitor 222 that detects an anomaly of base stations and determines to perform mapped measures in accordance with whether there is a hardware fault in the base stations. The hardware fault monitor 222, which is a set of instructions or a code stored in the storage 230, may be an instruction/code temporarily resided in the controller 220 or a storage space that keep instructions/codes, or a portion of a circuitry constituting the controller 220. According to various embodiments of the disclosure, the controller 220 can control a monitoring apparatus to perform operations according to various embodiments to be described below.

The storage 230 stores data such as fundamental programs, applications, and setting information for operation of the monitoring apparatus. The storage 30 may be a volatile memory, a nonvolatile memory, or a combination of a volatile memory and a nonvolatile memory. The storage 230 provides the kept data in response to a request from the controller 220. According to various embodiments of the disclosure, the storage 230 can keep a mapping table 232 that is information for determining mapped measures in accordance with there is a hardware fault in base stations, and hardware log information 234 that is information related to the performance of base stations that is considered to determine whether the base stations are normally operated.

Figure 3:
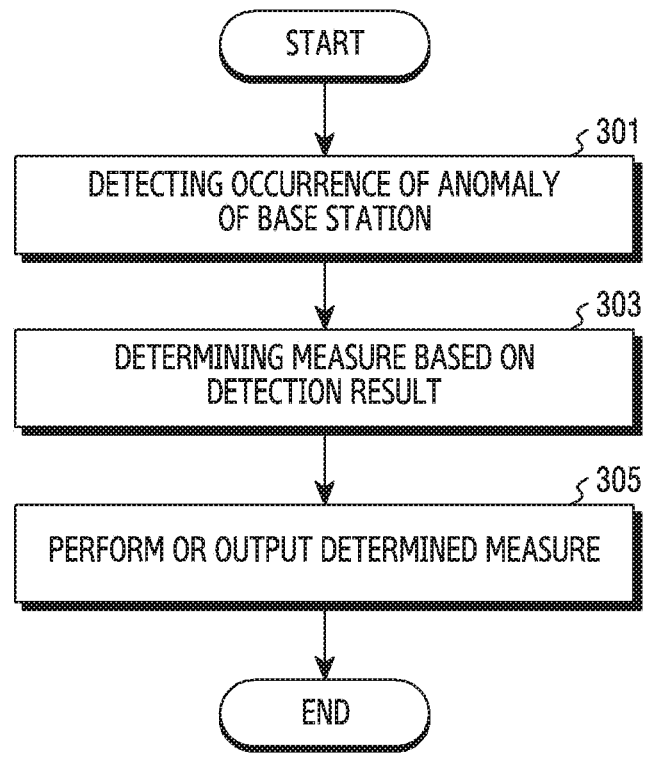
FIG. 3 is a flowchart of a monitoring apparatus in a wireless communication system according to an embodiment of the disclosure.

FIG. 3 is a flowchart of a monitoring apparatus in a wireless communication system according to an embodiment of the disclosure. FIG. 3 exemplifies an operation method of the monitoring apparatus 100.

Referring to FIG. 3, in operation 301, the monitoring apparatus detects an anomaly occurring in a base station. The anomaly means a situation in which a possibility of performance deterioration of the base station is expected. The monitoring apparatus can detect an anomaly, based on information provided from the base station. For example, information that is provided from a base station may include information related to network performance (e.g., data processing capacity, a call drop rate, and an error generation ratio), information about value measured by a sensor (e.g., temperature and humidity), and information about the operation state of the base station (e.g., power consumption amount, transmission power, and operation voltage). The information that is provided from a base station may include an alarm showing a quantified value or whether a specific state has been generated, etc. Accordingly, the monitoring apparatus can determine an anomaly by checking whether a quantified value comes out of a range defined as normality or checking whether a specific state has been generated.

In operation 303, the monitoring apparatus determines a measure, based on a detection result. In more detail, when an anomaly occurs in a base station, the monitoring apparatus can recognize whether there is a hardware fault in the base station and the type of the hardware fault and can determine a measure corresponding to the recognition result. According to various embodiments of the disclosure, the monitoring apparatus can recognize whether there is a hardware fault and the type of the hardware fault, based on data obtained by modeling the characteristic of a performance anomaly of a base station. The monitoring apparatus can also determine at least one measure corresponding to the recognition result, based on a mapping table stored in advance in the monitoring apparatus.

In operation 305, the monitoring apparatus performs or outputs the determined measure. According to an embodiment, the monitoring apparatus can perform at least one measure determined based on the mapping table. According to various embodiments of the disclosure, the monitoring apparatus can transmit a signal for giving an instruction to perform the at least one measure determined based on the mapping table to another device. According to another embodiment of the disclosure, the monitoring apparatus can output visual display on a screen to giving an instruction to perform the at least one measure determined based on the mapping table.

As described above, the measure for handling an anomaly occurring in a base station can be determined in accordance with whether there is a hardware fault in the base station and the type of the hardware fault. Hereafter, detailed operations of the monitoring apparatus for recognizing whether there is a hardware fault in a base station and the type of the hardware fault are described with reference to FIG. 4.

Figure 4:
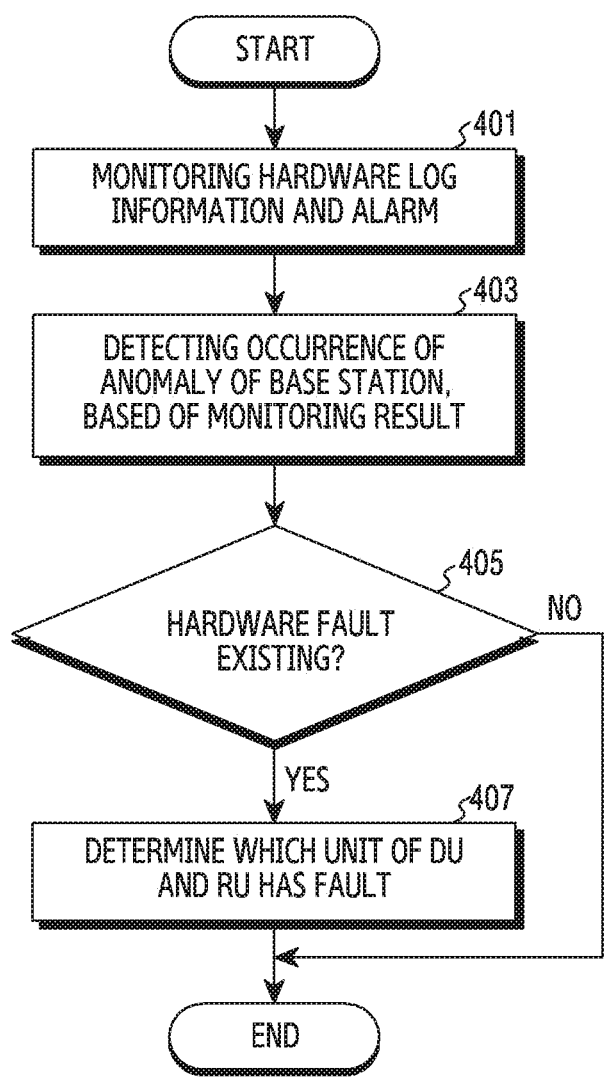
FIG. 4 is a flowchart for determining whether there is a hardware fault and the hardware fault type in a wireless communication system according to an embodiment of the disclosure.

FIG. 4 is a flowchart for determining whether there is a hardware fault and the hardware fault type in a wireless communication system according to an embodiment of the disclosure. FIG. 4 exemplifies an operation method of the monitoring apparatus 100.

Referring to FIG. 4, in operation 401, the monitoring apparatus monitors hardware log information and an alarm. The hardware log information includes at least one of a visual timestamp in which measurement data for a base station are recorded, an alarm state showing whether an alarm for indicating that an anomaly has occurred in the base station has been generated, measurement data for the base station, and a set value for the performance of the base station.

In operation 403, the monitoring apparatus detects an anomaly that has occurred in the base station, based on the monitoring result. For example, the monitoring apparatus can determine a decrease of any one of performance parameters such as the data processing capacity, transmission power, and operation voltage of a base station. In another example, the monitoring apparatus can detect an increase of at least one of parameters such as the power consumption amount and the call drop ratio of a base station. In another example, the monitoring apparatus can detect that surrounding temperature, humidity, etc. come out of normal ranges. In detail, the monitoring apparatus can detect that an alarm about at least one performance parameter has been generated and that a performance measurement value has decreased under a critical value or has exceeded the critical value. Alternatively, the monitoring apparatus can detect a performance measurement value has decreased under or increased over a set value, even if an alarm is not generated. The set value may be a target value set in advance for the performance of the base station.

In operation 405, the monitoring apparatus checks whether there is a hardware fault. In detail, when it is detected that an anomaly has occurred in a base station, the monitoring apparatus can check whether the detected anomaly has been caused by a hardware fault or whether the detected anomaly has been caused by another fault that is not a hardware fault. The fault that is not a hardware fault means at least one of a fault in another component (e.g., software) of the base station device or influence by the surrounding environment (e.g., deterioration of a cable, an increase in atmospheric temperature, wetting).

In operation 407, when it is determined that there is a hardware fault, the monitoring apparatus determines which one of a digital unit (DU) or a radio unit (RU) a fault has been generated in. That is, the monitoring apparatus can determine that a fault has been generated only the DU, that a fault has been generated in only the RU, or that a fault has been generated in both of the DU and the RU.

As described above, whether there is a hardware fault in a base station can be determined based on information acquired through monitoring. According to an embodiment, the operation for determining whether there is a hardware fault and the type of the hardware fault may be performed using data analysis and modeling based on an artificial intelligence (AI).

Figure 5:
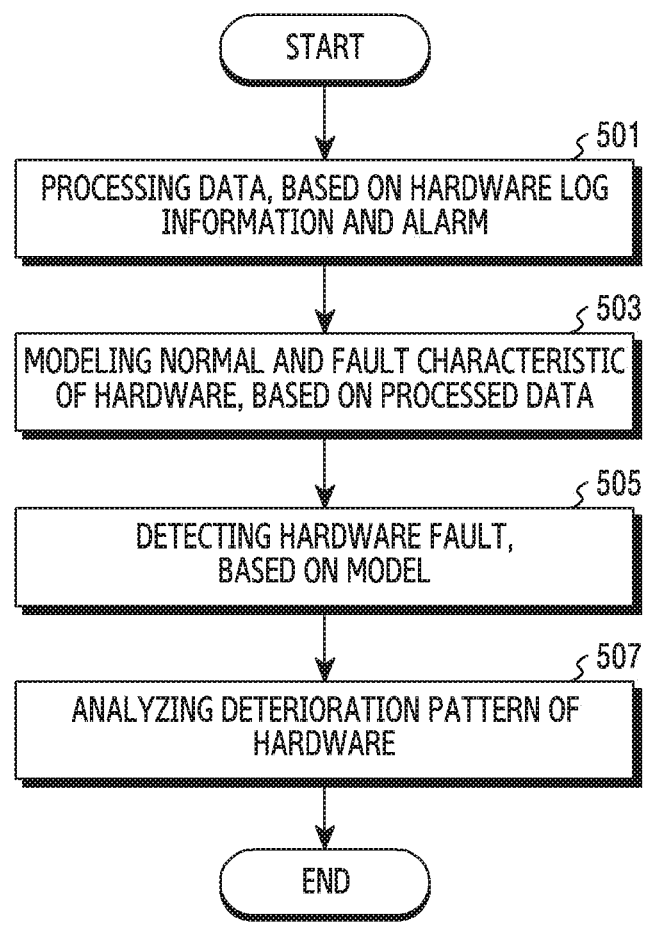
FIG. 5 shows an algorithm that determines whether there is a hardware fault due to an artificial intelligence (AI) in a wireless communication system according to an embodiment of the disclosure.

FIG. 5 shows an algorithm that determines whether there is a hardware fault due to an artificial intelligence in a wireless communication system according to an embodiment of the disclosure. FIG. 5 exemplifies an operation method of the monitoring apparatus 100.

Referring to FIG. 5, in operation 501, the monitoring apparatus process data, based on hardware log information and an alarm. For example, at least one data of an alarm state, measurement data for the performance of a base station, and a set value for the performance of the base station may not exist for at least one timestamp in hardware log information generated in the past. That is, when there is a mission value in hardware log information, the monitoring apparatus compensates for the missing value. After compensating for the missing value, the monitoring apparatus can process data by regularizing the data of the hardware log information.

In operation 503, the monitoring apparatus models normal and fault characteristics of hardware, based on the processed data. In this case, the monitoring apparatus can model a characteristic indicated by data when the hardware is in a normal state and a characteristic indicated by data when the hardware has a fault, through deep learning. In more detail, when measurement data for at least one performance parameter indicate a specific value, the monitoring apparatus acquires information about the operation of the base station. For example, the monitoring apparatus can learn whether the base station has normally operated, whether there was a fault in hardware, or whether there was another fault from the hardware log information in accordance with the measurement value of a first parameter and the measurement value of a second parameter. By collecting this information, the monitoring apparatus can model normal and fault characteristics of hardware by statistically classifying the measurement data of the base station in accordance with reasons for an anomaly. When the determination based on a model is wrong, the monitoring apparatus can correct the normal and fault characteristics of hardware and improve the accuracy in determination of whether there is a hardware fault, by reflecting the data in this case.

In operation 505, the monitoring apparatus detects a hardware fault, based on a model. In operation 503, as described above, the monitoring apparatus can determine whether there is a hardware fault, based on fault characteristic modeling of hardware together with whether an alarm has been generated. According to various embodiments of the disclosure, the result about whether there is a hardware fault can be output as visual display through a display unit.

In operation 507, the monitoring apparatus analyzes a deterioration pattern of hardware. In detail, the monitoring apparatus can predict that a hardware fault will be generated by analyzing the deterioration pattern of the hardware according to lapse of time through characteristic modeling using the hardware log information. According to various embodiments of the disclosure, the operation 507 may be performed in parallel with the operation 505.

As described above, the operation of FIG. 5 is performed by a monitoring apparatus, but, according to another embodiment, operations 501 to 503 may be performed by another device. In this case, the device can model normal and fault characteristic of hardware and can provide a generated model to a monitoring apparatus.

Figure 6:
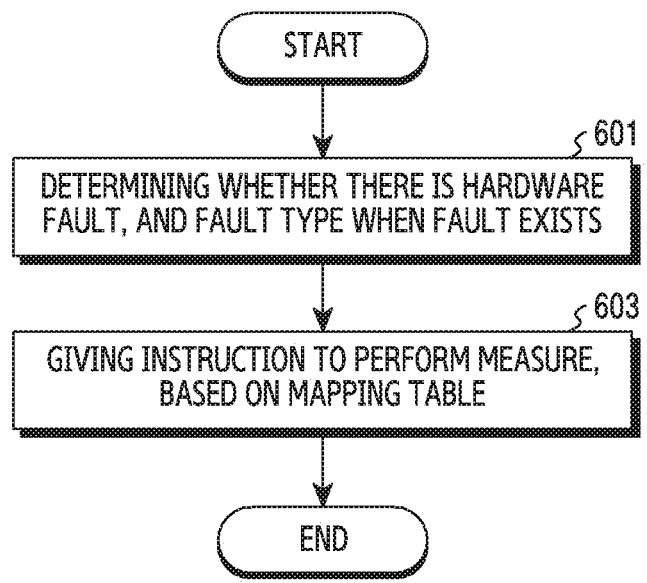
FIG. 6 is a flowchart for determining a measure according to the hardware fault type in a wireless communication system according to an embodiment of the disclosure.

FIG. 6 is a flowchart for determining a measure according to the hardware fault type in a wireless communication system according to an embodiment of the disclosure. FIG. 6 exemplifies an operation method of the monitoring apparatus 100.

Referring to FIG. 6, in operation 601, the monitoring apparatus determines whether there is a hardware fault, and the type of a fault when there is a fault. As described above, monitoring apparatus can determine whether an anomaly occurring in a base station is caused by a hardware fault, based on normal and fault characteristics of the hardware. If it is determined as a hardware fault, the monitoring apparatus determines whether it is caused by a software fault or influence by a surrounding environment. Alternatively, when it is determined as a hardware fault, the monitoring apparatus can determine the type of the fault by checking which unit of the DU and the RU has the fault.

In operation 603, the monitoring apparatus gives an instruction to perform a measure, based on a mapping table. In this case, at least one measure for handling each type of fault is mapped and stored in a stable for the fault of each type. That is, at least one measure may be set in advance and stored in a mapping table. According to various embodiments, at least one measure may be at least one measure that can be sequentially or selectively attempted, depending on situations. An example of the mapping table is the following Table 1.

TABLE 1

| Alarm state | DU fault state | RU fault state | Other faults | Measures |
| --- | --- | --- | --- | --- |
| generated | normal | normal | software | trouble shooting (SW), optimizing first, second cells |
| generated | normal | normal | surrounding environment | trouble shooting (Env), optimizing first, second cells |

TABLE 1-continued

| Alarm state | DU fault state | RU fault state | Other faults | Measures |
| --- | --- | --- | --- | --- |
| generated | normal | fault | — | optimizing first cell, replacing hardware |
| generated | fault | normal | — | optimizing second cell, replacing hardware |
| generated | fault | fault | — | optimizing second cell, replacing hardware |
| not generated | normal | normal | — | no measure |
| not generated | normal | fault | — | optimizing first cell, replacing hardware |
| not generated | fault | normal | — | optimizing second cell, replacing hardware |
| not generated | fault | fault | — | optimizing second cell, replacing hardware |

Referring to Table 1, for example, it is determined that an alarm has been generated but hardware normally operates and there is another fault (e.g., software fault or influence by the surrounding environment) from hardware log information, the monitoring apparatus can be given an instruction to perform at least one of trouble shooting, a measure of optimizing a first cell, or a measure of optimizing a second cell. As another example, when determining that an alarm has not been generated but there is a fault in the hardware RU, the monitoring apparatus can give an instruction to perform at least one of measure of optimizing the first cell or replacing the hardware. In this case, if the hardware can be immediately replaced, the measure of replacing the hardware can be performed, but if the hardware cannot be immediately replaced, a cell optimization measure is performed first, whereby the base station can keep providing services.

As described above, although measures according to some of the fault types described in Table 1 were described, the measures according to other fault types described in Table 1 may be described in the same way. In other words, the measures according to other fault types can be also be sequentially or selectively performed, depending on situations. Further, measures that classification of fault types and measures to be mapped were described with reference to Table 1, but this is only an exemplary description and a mapping table that is different from Table 1 may be proposed in accordance with various embodiments.

As described above, when it is determined that there is a hardware fault, but the hardware cannot be immediately replaced, a cell optimization measure may be performed first. In this case, the monitoring apparatus can determine again whether hardware replacement has to be performed after the cell optimization measure is performed. Hereafter, detailed operations are described with reference to FIG. 7.

Figure 7:
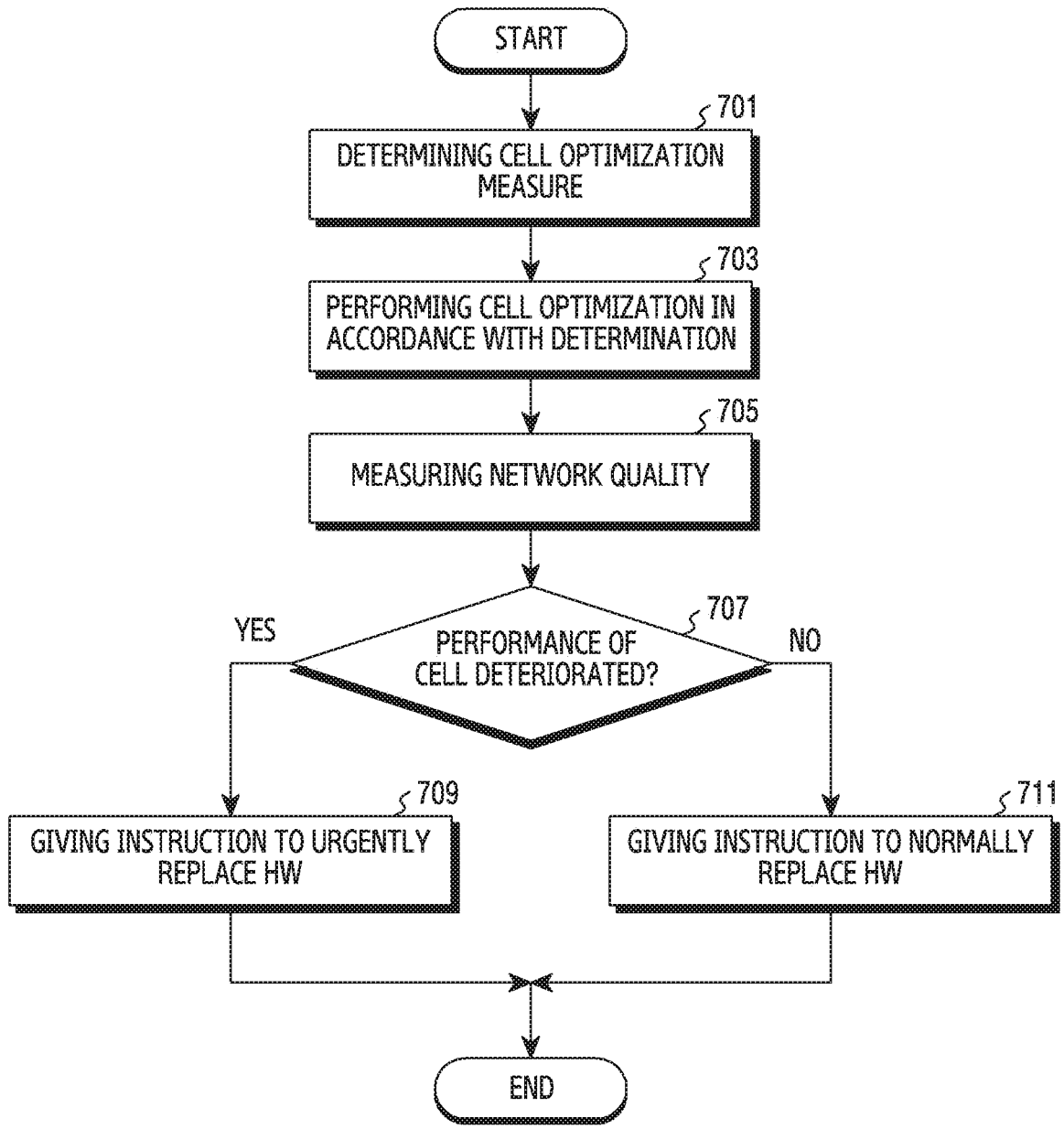
FIG. 7 is a flowchart for determining whether there is a need for urgent replacement of hardware after cell optimization is performed in a wireless communication system according to according to an embodiment of the disclosure.

FIG. 7 is a flowchart for determining whether there is a need for urgent replacement of hardware after cell optimization is performed in a wireless communication system according to an embodiment of the disclosure. FIG. 7 exemplifies an operation method of the monitoring apparatus 100.

Referring to FIG. 7, in operation 701, the monitoring apparatus determines a cell optimization measure as a measure according to a determined fault type. Referring to Table 1, the monitoring apparatus can determine to perform at least one of a first cell optimization measure or a second cell optimization measure.

In operation 703, the monitoring apparatus performs a cell optimization measure in accordance with the determination.

The monitoring apparatus can determine to perform at least one cell optimization measure in accordance with the hardware fault type. For example, the targets to be controlled for cell optimization measure may depend on which components of a base station a hardware fault has occurred in. For example, for cell optimization, RUs connected to the same DU may be controlled or different DUs or at least one RU connected to another DU may be controlled.

In operation 705, the monitoring apparatus measures the quality of a network. In detail, the monitoring apparatus measures the quality of a network that is provided by a base station in an area where a fault has been generated, after performing a cell optimization measure.

In operation 707, the monitoring apparatus determines whether cell performance has deteriorated. That is, the monitoring apparatus determines whether performance over a critical value is provided after a cell, in which a fault has been generated, performs a cell optimization measure, based on a measurement result.

When it is determined that the cell performance has deteriorated, in operation 709, the monitoring apparatus gives an instruction to urgently replace hardware. The fact that cell performance has deteriorated means that the performance of the base station has not been recovered to the normal operation range although a cell optimization measure has been performed. Accordingly, the monitoring apparatus can give an instruction to immediately replace hardware.

When it is determined that the cell performance has not been deteriorated, in operation 711, the monitoring apparatus gives an instruction to normally replace hardware. The fact that cell performance has not been deteriorated means that the performance of the base station has been recovered to the normal operation range because a cell optimization measure has been performed. Accordingly, the monitoring apparatus can give an instruction to normally replace hardware.

As described with reference with FIG. 7, the monitoring apparatus can perform the first cell optimization measure or the second cell optimization measure, depending on the hardware fault type. Hereafter, a cell optimization measure is described in more detail with reference to FIGS. 8A and 8B.

Figure 8A:
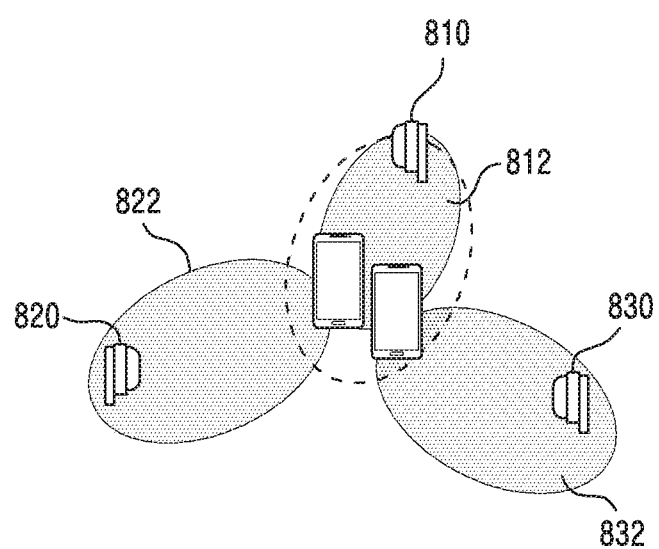
FIG. 8A shows an example of a cell optimization measure in a wireless communication system according to according to an embodiment of the disclosure.
Figure 8B:
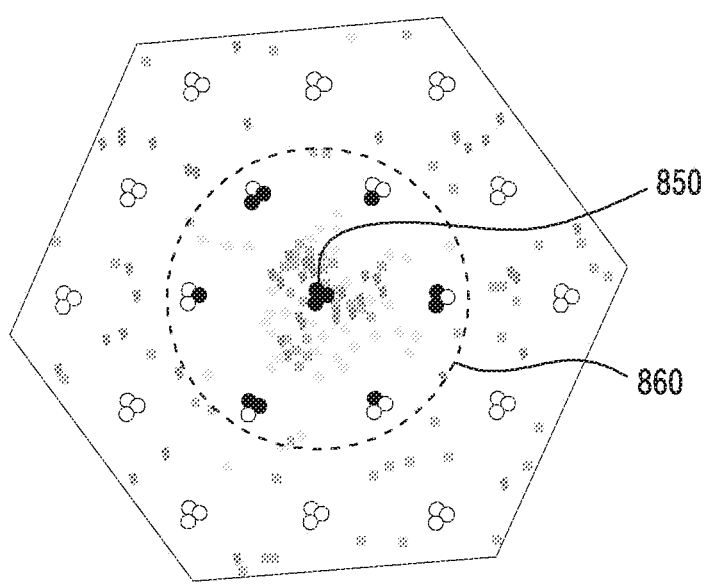
FIG. 8B shows an example of a cell optimization measure in a wireless communication system according to an embodiment of the disclosure.

FIG. 8A shows an example of a cell optimization measure in a wireless communication system according to an embodiment of the disclosure and FIG. 8B shows an example of a cell optimization measure in a wireless communication system according to an embodiment of the disclosure. According to an embodiment of the disclosure, a cell optimization measure can be performed by a monitoring apparatus. Alternatively, according to another embodiment of the disclosure, when a monitoring apparatus gives an instruction to perform a cell optimization measure, an optimization device can perform the cell optimization measure.

When determining that there is a fault only in hardware RU, the monitoring apparatus can perform a first optimization measure of FIG. 8A. Referring to FIG. 8A, when there is a fault only in hardware RU, a service is not normally provided in a partial area in one cell. For example, a radio unit (RU) 810 provides a communication service for the area of a sector 812, an RU 820 provides a communication service for the area of a sector 822, and an RU 830 provides a communication service for the area of a sector 832. When a fault is generated in the RU 810, a communication service cannot be normally provided in the sector 812 that is a partial area in a cell. In this case, the monitoring apparatus can perform a first cell optimization measure that covers the area of the sector 812 in which a fault has been generated, by controlling the RUs 820 and 830 connected to the same DU together with the RU 810.

When determining that there is a fault only in hardware DU or there is a fault in both of an RU and a DU, the monitoring apparatus can perform a second optimization measure of FIG. 8B. Referring to FIG. 8B, when a fault is generated in hardware DU, a service is not normally provided in the entire cell that is provided from one base station. For example, when a fault is generated in a DU of a base station that provides a cell 850, a communication service cannot be normally provided in the entire cell 850. In this case, the monitoring apparatus can perform the second cell optimization measure that makes other cells cover the area of the cell 850 by controlling DUs of base stations installed within a predetermined distance 860 from a base station or at least one RU connected to the DUs.

According to various embodiments of the disclosure, the monitoring apparatus can determine whether there is a hardware fault, the type of the hardware fault, and measures according to types through the operations described with reference to FIGS. 3 to 7. According to an embodiment, the monitoring apparatus may include a display unit to visually provide such resultant data. According to another embodiment, the monitoring apparatus can transmit resultant data to another device including a display unit, and the device can output the resultant data on the display unit. An example of an interface (IF) that is provided by a monitoring apparatus is described hereafter with reference to FIG. 9.

Figure 9:
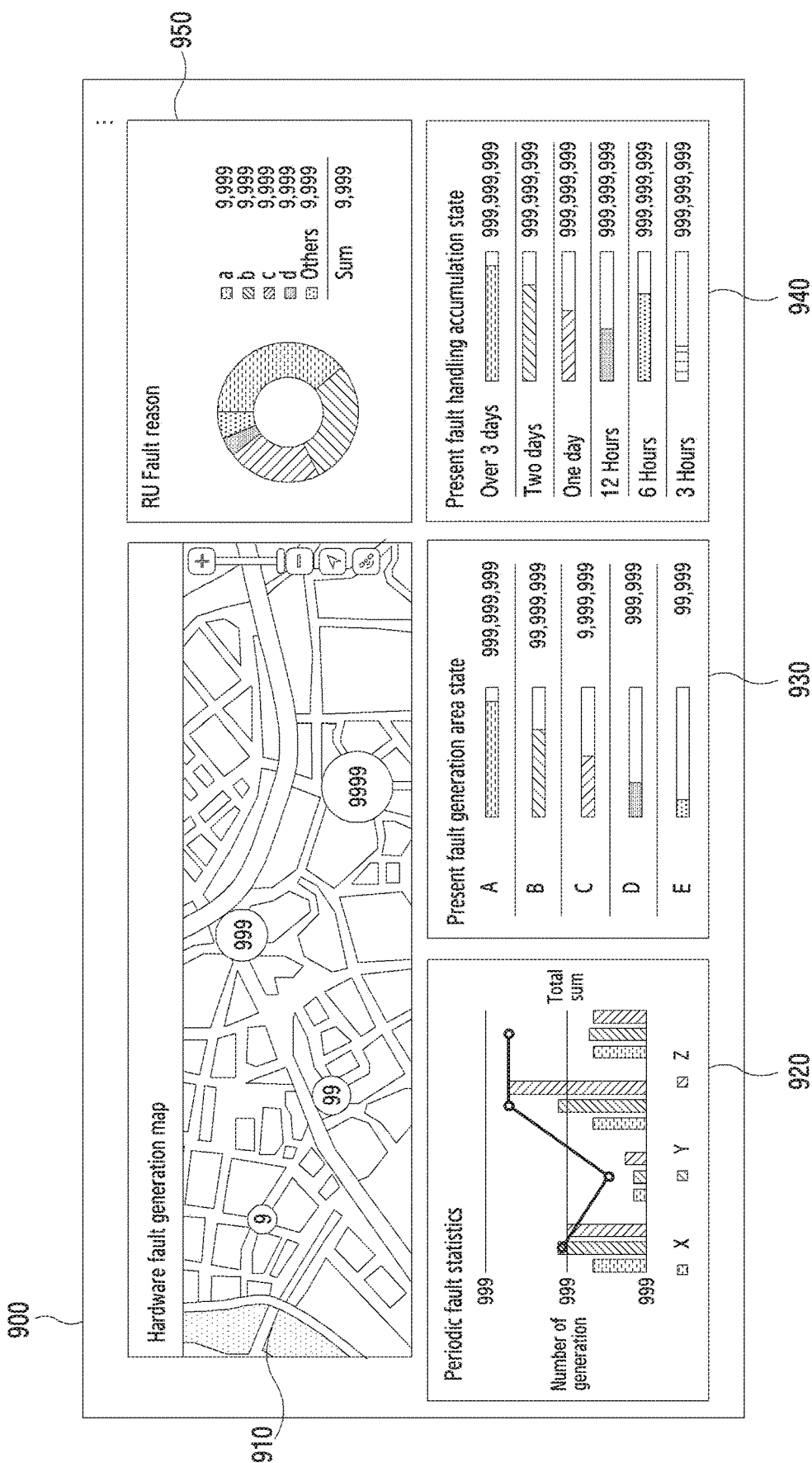
FIG. 9 shows an interface (IF) of a monitoring apparatus for visually providing statistics related to a hardware fault in a wireless communication system according to an embodiment of the disclosure.

FIG. 9 shows an IF of a monitoring apparatus for visually providing statistics related to a hardware fault in a wireless communication system according to an embodiment of the disclosure. FIG. 9 exemplifies an IF 900 of the monitoring apparatus 100.

Referring to FIG. 9, the monitoring apparatus can provide at least one of a hardware fault generation map 910, periodic fault statistics 920, a present fault generation area state 930, a present fault handling accumulation state 940, and an RU fault reason 950. According to various embodiments of the disclosure, information related to hardware fault generation in each area such as the hardware fault generation map 910 and the present fault generation area state 930 can be generated and provided, as described below. In detail, the monitoring apparatus can acquire and store information about the area where a base station is installed from the base station. When the monitoring apparatus determine base stations in which a hardware fault has been generated, based on hardware log information, it can determine the area information of the base station and can classify the information for the areas. In this case, various statistics for areas where a hardware fault has been generated can be provided, based on the timestamp of the hardware log information. For example, as for the hardware fault generation map 910, the number of base stations in which a hardware fault for each area can be displayed in real time. As another example, as for the present fault generation area state 930, the number of generation(s) of hardware faults for each area for a predetermined time can be provided.

According to various embodiments of the disclosure, the periodic fault statistics 920 and the RU fault reason 950 can be generated and provided, based on hardware log information and the result of determining a fault by the monitoring apparatus. As for the periodic fault statistics 920, when a fault type is determined, the monitoring apparatus can check a timestamp from the hardware log information, can classify the number of generation(s) of each type of fault for each date, and can provide them as a graph. For example, the monitoring apparatus can provide the number of generation of faults for each data by displaying each fault type in a bar graph and can provide the total of the number of generation of faults using a graph of broken lines. As for the RU fault reason 950, when determining that there is a fault in an RU of a base station, the monitoring apparatus can check the alarm name of the data part showing the fault characteristic of the RU, based on hardware log information. Accordingly, the monitoring apparatus can provide the number of generation of faults for each alarm name as a graph when an RU fault is generated.

According to various embodiments of the disclosure, the present fault handling accumulation state 940 can be generated and provided, based on whether a measurement given by the monitoring apparatus has been performed. In this case, the monitoring apparatus can store information about the point in time when determining a measurement in accordance with a fault type of a base station, and can check whether a fault has been handled through network quality measurement after the measure is performed. Accordingly, when the fault has not been handled, the monitoring apparatus can classify periods for which handling is accumulated by checking the time that has passed from the point in time when determining a measure, and can provide the classification result through a graph or numbers.

As described above, although the hardware fault generation map 910, periodic fault statistics 920, present fault generation area state 930, present fault handling accumulation state 940, and RU fault reason 950 were described with reference to FIG. 9, these are only examples, and various items of information about faults can be provided using various methods in accordance with various embodiments of the disclosure.

According to various embodiments of the disclosure, it is possible to more accurately determine whether there is a hardware fault and the types of faults by classifying reasons of anomalies occurring in base station in categories. Further, an appropriate measure for a fault type can be determined through a simple process by storing in advance measures according to fault types in the form of a look-up table. Hereafter, the entire system in which a fault reason of a base station is determined and, a measure and following measures according to the fault reason are performed is described with reference to FIG. 10.

Figure 10:
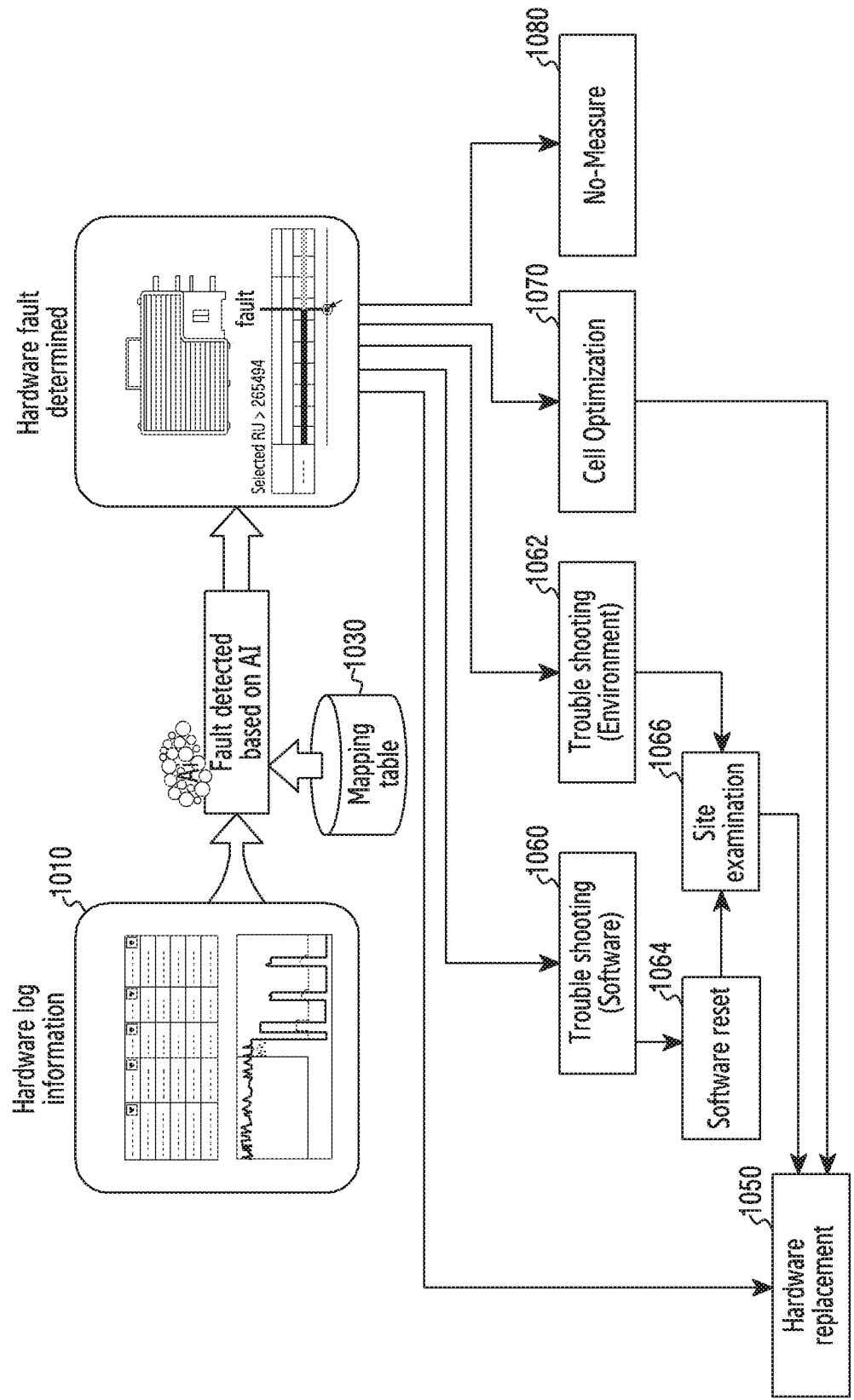
FIG. 10 is a conceptual diagram for handling an anomaly occurring in a base station device in a wireless communication system according to an embodiment of the disclosure.

FIG. 10 is a conceptual diagram for handling an anomaly occurring in a base station device in a wireless communication system according to an embodiment of the disclosure.

Referring to FIG. 10, when an anomaly occurs in a base station, various data such as state information showing whether an alarm has been generated, measured time, a performance measurement value, and a set value are stored as hardware log information 1010. Further, at least one measure for handling faults of the base station is stored in a mapping table 1030 in accordance with fault types. The monitoring apparatus determines whether the anomaly of the base station recorded in the hardware log information has been caused by a hardware fault by monitoring normal and fault characteristics of hardware through learning. When it is determined that the anomaly has been caused by a hardware fault, based on a model, the monitoring apparatus checks which unit of the hardware the fault has been generated in, and determines a measure corresponding to the fault reason, based on a mapping table. According to various embodiments of the disclosure, the measures stored in the mapping table 1030 may be hardware replacement 1050, trouble shooting for software 1060, trouble shooting for a surrounding environment 1070, a cell optimization measure 1070, and no-measure 1080.

When it is determined that there is a hardware fault, the monitoring apparatus can give an instruction to perform the hardware replacement 1050 and the cell optimization 1070. In this case, if hardware can be immediately replaced, hardware replacement can be performed. However, it is difficult to immediately replace hardware, cell optimization can be performed as a temporary measure. As described with reference to FIG. 7, urgent replacement or normal replacement of hardware can be performed by determining whether a network quality has been recovered after the cell optimization is performed.

When it is determined that there is a fault in software rather than a hardware fault, the monitoring apparatus can give an instruction to perform trouble shooting 1060 for the software. In this case, resetting of software 1064 is remotely performed and the network quality is performed. When the network quality has been recovered, the procedure of handling the fault of the base station is finished. However, when the network quality has not been recovered, the surrounding situations around the base station device are examined through site examination 1066. When it is determined that the network quality is not recovered even through the site examination 1066, the hardware replacement 1050 can be performed.

When it is determined that there is influence by the surrounding environment rather than a hardware fault, the monitoring apparatus can give an instruction to perform trouble shooting 1062 for the surrounding environment. In this case, various environmental factors such as the temperature and humidity of the environment in which equipment is installed, and aging of a cable are examined through the site examination 1066. When it is determined that the network quality is not recovered even through the site examination 1066, finally, the hardware replacement 1050 can be performed.

When an anomaly has occurred in a base station, but it is determined that a measurement value is in a normal range, the monitoring apparatus can give an instruction of the no-measure 1080.

As described above, according to various embodiments of the disclosure, it is possible to reduce unnecessary cell outage that is generated due to hardware replacement by more accurately detecting the reasons of faults generated in a base and performing measures mapped in advance.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of (some or all) of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an apparatus in a wireless communication system, the method comprising:
    identifying a failure within a base station, based on hardware log information;
    identifying a type of the failure which is one of a fault of a radio unit (RU) or a fault of a digital unit (DU), based on the hardware log information;
    if the type of the failure is the fault of the DU, identifying a second operation of a second cell optimization; and
    if the type of the failure is the fault of the RU and not the fault of the DU, identifying a first operation of a first cell optimization,
    wherein the first operation of the first cell optimization is performed by controlling at least one other RU connected to the DU, and
    wherein the second operation of the second cell optimization is performed by controlling another DU or at least one RU connected to the another DU.

2. The method of claim 1, wherein the identifying of the failure within the base station comprises:
    monitoring the hardware log information and an alarm; and
    identifying the failure within the base station, based on the monitored hardware log information and the monitored alarm.

3. The method of claim 1, further comprising:
    if the identifying of the failure within the base station, based on the hardware log information,
    transmitting an instruction to replace at least one hardware to the base station.

4. The method of claim 1, further comprising:
    identifying a quality of a network provided from the base station;
    identifying whether a performance of the base station has deteriorated, based on the identified quality of the network provided from the base station;
    if it is identified that the performance of the base station has deteriorated,
    transmitting an instruction to urgently replace hardware to the base station; and
    if it is identified that the performance of the base station has not deteriorated, transmitting an instruction to normally replace the hardware to the base station.

5. The method of claim 1, further comprising:
    if the type of the failure is not the fault of the RU and not the fault of the DU,
    identifying at least one of a trouble shooting for software, a trouble shooting for an environment, the first operation of the first cell optimization, or the second operation of the second cell optimization.

6. The method of claim 1, wherein the hardware log information comprises:
    at least one of a visual timestamp in which time of measurement data for the base station is recorded, an alarm state showing whether an alarm for indicating that the failure has occurred within the base station has been generated, measurement data for a performance of the base station, or a configuration value for the performance of the base station.

7. An apparatus in a wireless communication system, the apparatus comprising:
    a storage; and
    at least one processor configured to:
        identify a failure within the base station, based on hardware log information,
        identify a type of the failure which is one of a fault of a radio unit (RU) or a fault of a digital unit (DU), based on the hardware log information,
        if the type of the failure is the fault of the DU, identify a second operation of a second cell optimization;
        if the type of the failure is the fault of the RU and not the fault of the DU, identify a first operation of a first cell optimization,
    wherein the first operation of the first cell optimization is performed by controlling at least one other RU connected to the DU, and
    wherein the second operation of the second cell optimization is performed by controlling another DU or at least one RU connected to the another DU.

8. The apparatus of claim 7, wherein the at least one processor is further configured to:
    monitor the hardware log information and an alarm, and
    identify the failure within the base station, based on the monitored hardware log information and the monitored alarm.

9. The apparatus of claim 7, wherein the at least one processor is further configured to:
    if the identifying of the failure within the base station, based on the hardware log information,
    transmit an instruction to replace at least one hardware to the base station.

10. The apparatus of claim 7, wherein the at least one processor is further configured to:
    identify a quality of a network provided from the base station,
    identify whether a performance of the base station has deteriorated, based on the identified the quality of the network provided from the base station,
    if it is identified that the performance of the base station has deteriorated,
    transmit an instruction to urgently replace hardware to the base station, and
    if it is identified that the performance of the base station has not been deteriorated, transmit an instruction to normally replace the hardware to the base station.

11. The apparatus of claim 7, wherein the at least one processor is further configured to:
- if the type of the failure is not the fault of the RU and not the fault of the DU,
- identify at least one of a trouble shooting for software, a trouble shooting for an environment, the first operation of the first cell optimization, or the second operation of the second cell optimization.

12. The apparatus of claim 7, wherein the hardware log information comprises:
- at least one of a visual timestamp in which time of measurement data for the base station is recorded, an alarm state showing whether an alarm for indicating that the failure has occurred within the base station has been generated, measurement data for a performance of the base station, or a configuration value for the performance of the base station.

* * * * *